United States Patent [19]

Bronnert

[11] Patent Number: 5,076,617
[45] Date of Patent: Dec. 31, 1991

[54] SEAL FOR ASEPTIC FITTING ASSEMBLY

[76] Inventor: Herve X. Bronnert, 21495 Partridge Ct., Brookfield, Wis. 53005

[21] Appl. No.: 565,630
[22] Filed: Aug. 10, 1990
[51] Int. Cl.[5] .............................................. F16L 23/00
[52] U.S. Cl. .................................... 285/349; 285/113; 285/368; 285/349; 285/910; 277/180
[58] Field of Search ............... 285/336, 349, 350, 375, 285/917, 24, 910, 365, 111, 113, 368, 364; 277/205, 228, 229, 234, 235 R, 180

[56] References Cited

U.S. PATENT DOCUMENTS

| | | | |
|---|---|---|---|
| 2,522,195 | 1/1947 | Richardson | 285/350 X |
| 3,083,023 | 3/1959 | Creavey | 277/180 |
| 3,285,615 | 9/1963 | Trbovich | 277/180 |
| 3,339,948 | 6/1965 | Weitzel | 285/350 X |
| 3,630,483 | 12/1971 | Canalizo | 277/205 |
| 4,398,731 | 8/1983 | Gorman et al. | 277/205 X |
| 4,618,154 | 10/1986 | Frevdenthal | 277/205 |
| 4,630,833 | 12/1986 | Boyle et al. | 285/228 X |
| 4,817,994 | 4/1989 | Bronnert | 285/349 |

Primary Examiner—Randolph A. Reese
Assistant Examiner—Tim Aberle
Attorney, Agent, or Firm—Foley & Lardner

[57] ABSTRACT

A metallic seal ring assembly including a U-shaped ring having a bight section and a pair of legs, a flange on the end of each of the legs, each flange including a radial surface and an annular surface, the distance between the radial surfaces being greater than the width of the bight section of the ring and a resilient sealing material filling the space between the legs of the ring.

10 Claims, 3 Drawing Sheets

SEAL FOR ASEPTIC FITTING ASSEMBLY

FIELD OF THE INVENTION

The present invention relates to aseptic seals for pipe fittings and joints for food processing and other related applications and more particularly to a deformable self centering seal ring assembly having flanges which form a seal with the joint and a continuation of the internal diameter of the pipe joint.

BACKGROUND OF THE INVENTION

In my U.S. Pat. No. 4,817,994 entitled Aseptic Pipe Joint issued on Apr. 4, 1989, a C-shaped seal ring assembly is described for use in aseptic processing systems. This type of seal assembly has particular application in the processing of foods and other products such as pharmaceuticals which require careful handling and appropriate precautions to provide sanitary equipment and thereby prevent contamination of the product. The C-type seal assembly described in this patent is used to provide a seal in the ferrules for pipe joints. This type of seal assembly, because of its circular configuration, does not provide a continuation of the internal surfaces of the pipe joint resulting in a small trapping and buildup of product in the joint. The metal C-ring provides a minimal amount of contact with the joint surface through which contaminants such as bacteria may pass through the pipe joint, depending on the surface finishes.

SUMMARY OF THE PRESENT INVENTION

The aseptic seal ring assembly according to the present invention is used to seal the joint between the mating surfaces of the pipe joint ferrules. The seal is in the form of a U-shaped metallic ring filled with a resilient material such as rubber. The ring includes an enlarged flange or protuberance on the end of each of the legs of the ring which are deformed to provide a metallic seal between the flanges on the U-shaped ring and the corresponding surfaces of the pipe joint ferrules. The flanges also provide in combination with the resilient sealing material a continuation of the internal diameter of the ferrules which eliminates the trapping and/or buildup of product in the internal joint.

A principal feature of the invention is the provision of a sanitary seal for the pipe joints in an aseptic processing system in which the primary seal is formed by a deformable metallic ring having flanges which provide a positive metallic seal with the pipe joint surfaces.

In accordance with another aspect of the invention the aseptic seal includes a flange on each side of the seal ring which provide a continuation of the internal diameter of the surfaces of the pipe thus eliminating trapping or buildup of material at the pipe joint.

In accordance with another aspect of the invention, the metallic U-shaped seal ring is self centering and can be used to align the ferrules on assembly.

In accordance with a further aspect of the invention, the mating surfaces are plated with a pure soft metal to provide near absolute contact with the mating surfaces to prevent damage to the mating surfaces and lubricate the sliding surfaces during closing of the fitting.

Other principal features and advantages of the invention will become apparent to those skilled in the art upon review of the following drawings, the detailed description and the appended claims.

DETAILED DESCRIPTION OF THE DRAWINGS

Figure 1:
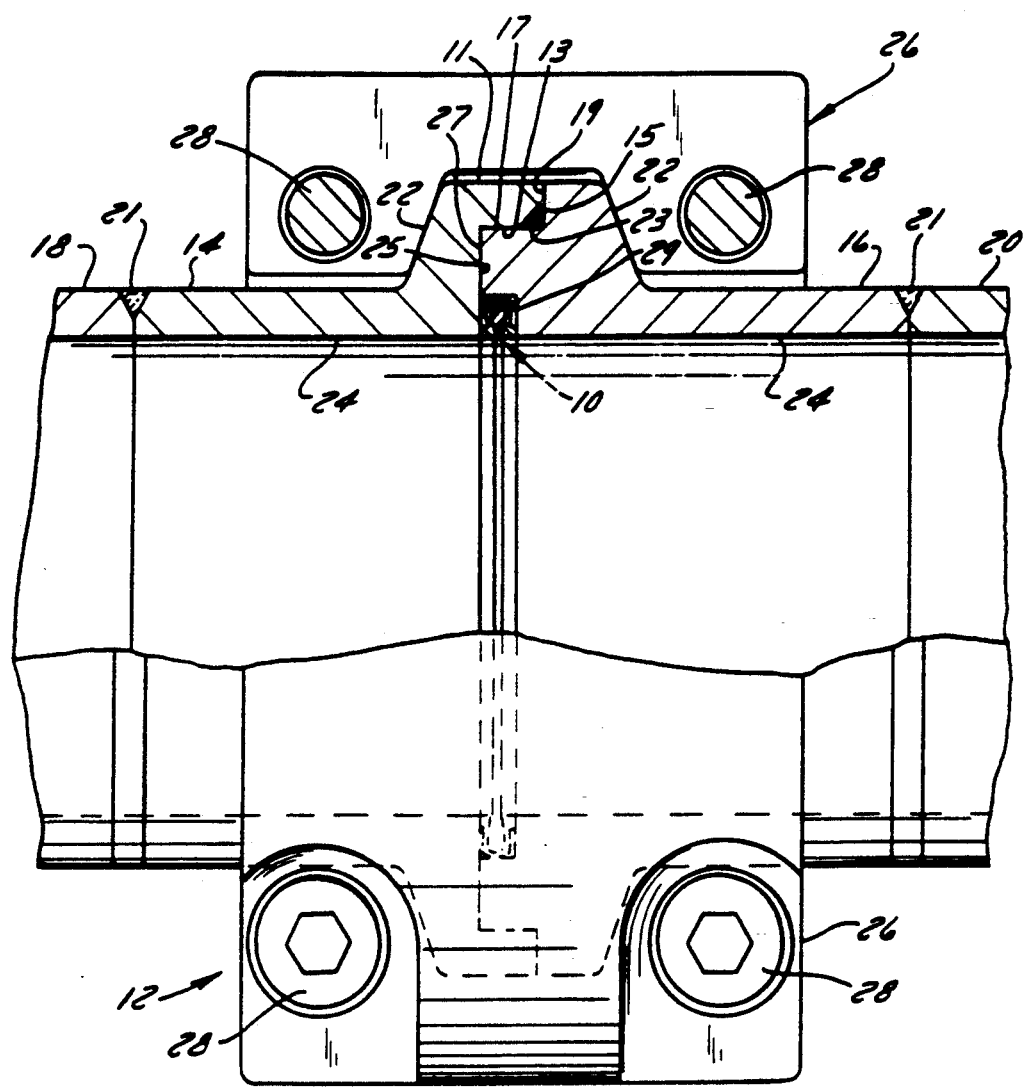
FIG. 1 is an elevation view partly in section of the pipe joint assembly according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Referring to FIG. 1, the U-shaped seal ring assembly 10 according to the present invention is shown positioned in a pipe joint 12 to form an aseptic seal between the ferrules 14 and 16. In this regard, the ferrules 14 and 16 which form the pipe joint assembly 12 are shown connected to the ends of tubes or pipes 18 and 20, respectively, by means of welds 21. Each of the ferrules 14 and 16 has a frusto conical outer surface 22, radial surfaces 25 and 27, and an internal bore 24 which corresponds to the internal diameter of the pipes 18 and 20. An annular recess is provided in the outer perimeter of ferrule 16 which includes an outer annular surface 17 and a radial surface 19. A counterbore 29 is provided in the surface 27 of the ferrule 16 which includes an inner annular surface 31 and a radial surface 33. The ferrule 14 includes a flange 11 having an inner annular surface 13 and a chamfered surface 15. The ferrules 14 and 16 are closed by aligning the flange 11 with the annular surface 17. An "O" ring seal 23 is positioned in the space between the chamfered surface 15 and the surfaces 17 and 19. The ferrules are clamped in position by means of V-shaped clamp members 26 which matingly engage the frusto conical surfaces 22 on the ferrules 14 and 16. The clamp members 26 are drawn together to close the joint by tightening bolts 28.

Figure 2:
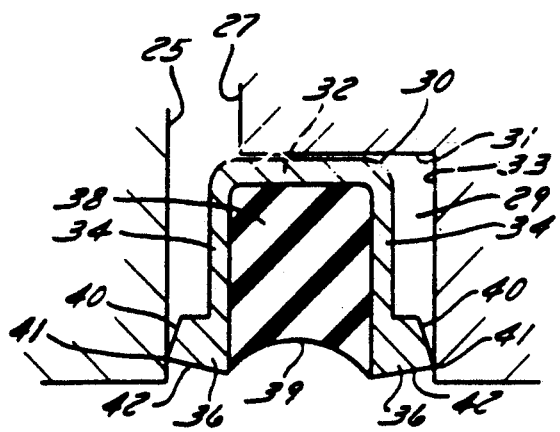
FIG. 2 is a cross section view of a portion of the pipe joint showing the U-shaped seal positioned in the joint.
Figure 3:
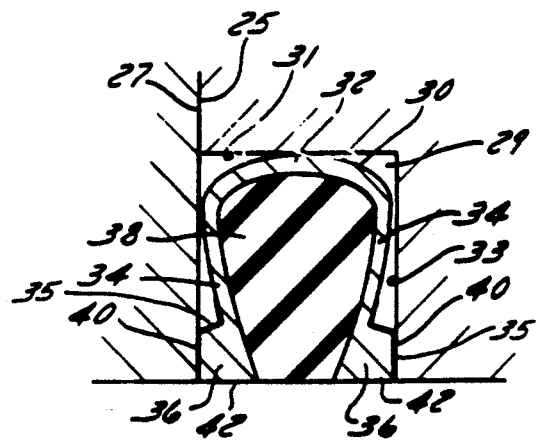
FIG. 3 is a view similar to FIG. 2 showing the configuration of the U-shaped seal when the joint is closed.

In accordance with the invention, the U-shaped seal assembly 10 as shown in FIGS. 2 and 3 generally includes a U-shaped metallic ring made of stainless steel, INCOLOY or other metals. The ring 30 includes a bight section 32 and a pair of legs 34. The ring 30 is filled with a resilient material 38 such as a RTV silicone rubber, which may be a high temperature, 450° to 500° F., compound made by G.E. This material can be pre-manufactured and introduced into the U-shaped ring to completely fill the space in the ring or cast in place. A concave profile 39 is provided in the inside surface of the material between the ends of the legs 34 of the ring. A flange or protuberance 36 is provided on the outside of the end of each of the legs 34.

In this regard, each of the flanges 36 is provided with a circumferential or radial surface 40 and an inner annular surface 42. The radial surface 40 can be flat, as shown, rounded or angular and intersects the inner annular surface 42 at a 90 degree angle forming a circular contact line 41. The U-shaped seal assembly 10 is initially positioned in the counterbore 29 as shown in FIG. 2 with the bight section 32 seated on the inner annular surface 31. When the pipe joint 12 is closed as shown in FIG. 3, the radial surfaces 40 on the flange will be in an abutting relation to the radial surfaces 25 and 33 on the ferrules and the inner annular surface 42 will form a continuation of and is flush with the internal bore 24 of the ferrules 14 and 16 as shown in FIG. 3. It should also be noted that the resilient material 38 will be squeezed sufficiently to force the concave surface 39 to fill the space between the ends of the legs and form a continuation of the inner annular surfaces 42 as shown in FIG. 3.

Figure 4:
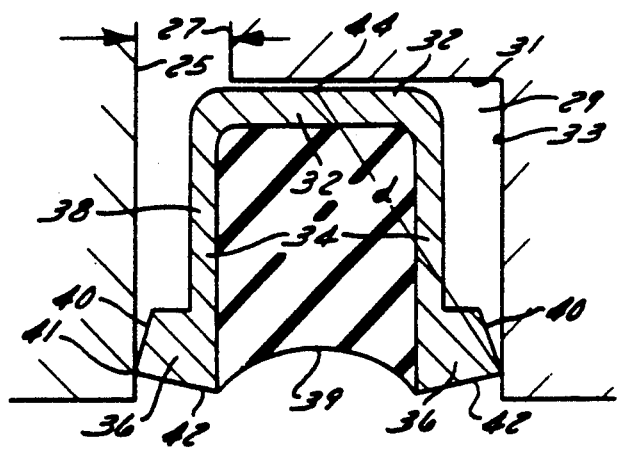
FIG. 4 is a view of the seal seated in the pipe joint.
Figure 5:
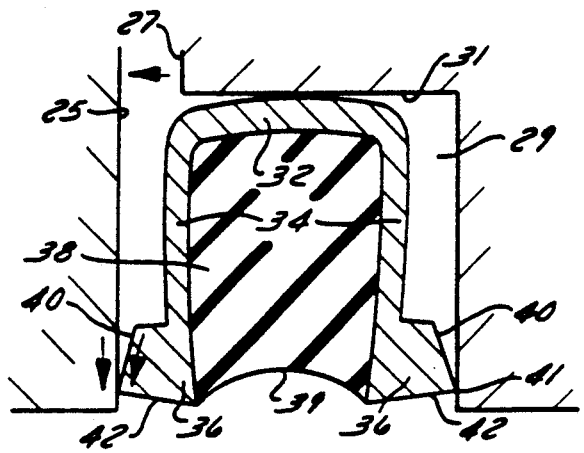
FIG. 5 is a view similar to FIG. 4 showing the initial movement of the flanges of the seal as the joint is closed.
Figure 6:
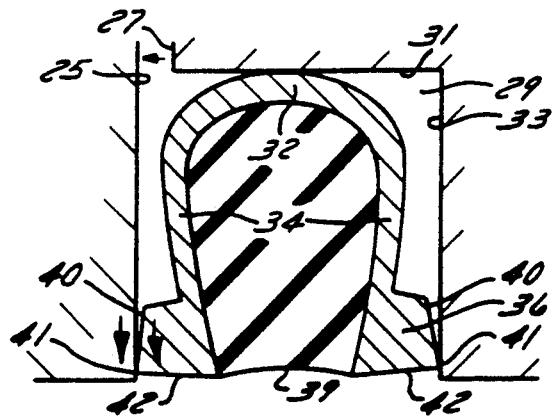
FIG. 6 is a view similar to FIG. 5 showing the position of the flanges just prior to closing.
Figure 7:
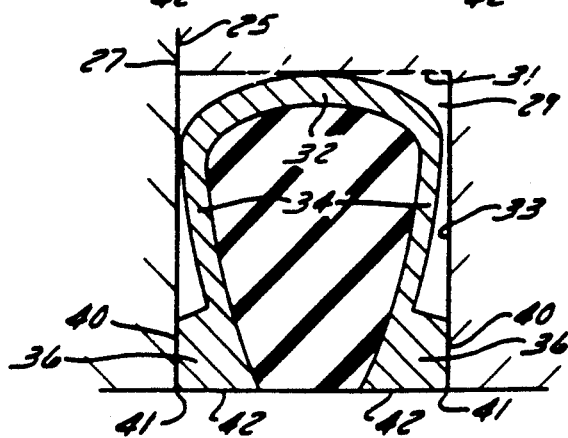
FIG. 7 is a view similar to FIG. 6 showing the joint closed with the flanges seated on the joint and forming a continuation of the internal bore of the pipe.

Referring to FIGS. 4 through 7 the U-shaped seal ring assembly 10 is shown in various stages of deformation as the pipe joint is closed from the initial open position, FIG. 4, to the fully closed position, FIG. 7.

In the initial stage, FIG. 4, the ring assembly 10 is positioned in the counterbore 29 with the bight section 32 in abutting relation to the annular surface 31. The contact lines 41 are positioned to engage the radial surfaces 25 on ferrule 14 and the radial surface 33 in counterbore 29. It should be noted that the distance "d" between the contact line 41 and the midpoint 44 of the bight section 32 will remain the same as the joint is closed.

In FIG. 5, the ferrules 14 and 16 are shown partially closed. The flanges 36 have been squeezed sufficiently to initially deform the legs 34 and to bend the bight section 32 about the center point 44. The center point 44 of the bight section will move toward the radial surface 33 of the counterbore. It should be noted that the contact line 41 has moved radially inwardly on radial surfaces 25 and 33, respectively.

In FIG. 6, the legs 34 have been forced inwardly sufficiently to move the contact line 41 of the surfaces 40 and 42 just short of the internal diameter 24 of the bore in the ferrules. The center 44 of the bight section 32 has also moved closer to the radial surface 33. It should also be noted that the concave profile 39 of the resilient material 38 has been squeezed inwardly to fill the space between the flanges 36.

In FIG. 7, the ferrules 14 and 16 have been fully closed with the radial surfaces 25 and 27 of the ferrules in abutting engagement. The flanges 36 have been squeezed far enough to align the contact line 41 with the internal diameter of the bore 24 of the ferrules. The radial surfaces 40 have been rotated into alignment with and matingly engage the radial surfaces 25 and 33 forming a metal to metal seal between the ring and the ferrules. The inner annular surfaces 42 form a continuation of the internal diameter of the bore 24 of the ferrules. The resilient material 38 will be squeezed sufficiently for the profile 39 of the resilient material to also form a continuous surface between the surfaces 42 of the flanges 36. The radial surfaces 25 and 27 of the ferrules are protected from contamination by the seals 23 and the U-shaped ring assembly 10.

The movement of the contact line 41 on the flanges 36 against the radial surfaces 25 and 33 may produce slight indentations in the surfaces 25 and 33. The surfaces 40 on the U-shaped ring 30 may be plated with a non-corrosive ductile material 35 (FIG. 3) which is preferably but not limited to pure nickel, or gold. Nickel is preferred due to its compatibility with the environment to which it is exposed. Nickel, being a ductile or soft material, deforms to form a molecular seal between the mating surfaces 40 and the radial surfaces 25 and 33.

Figure 8:
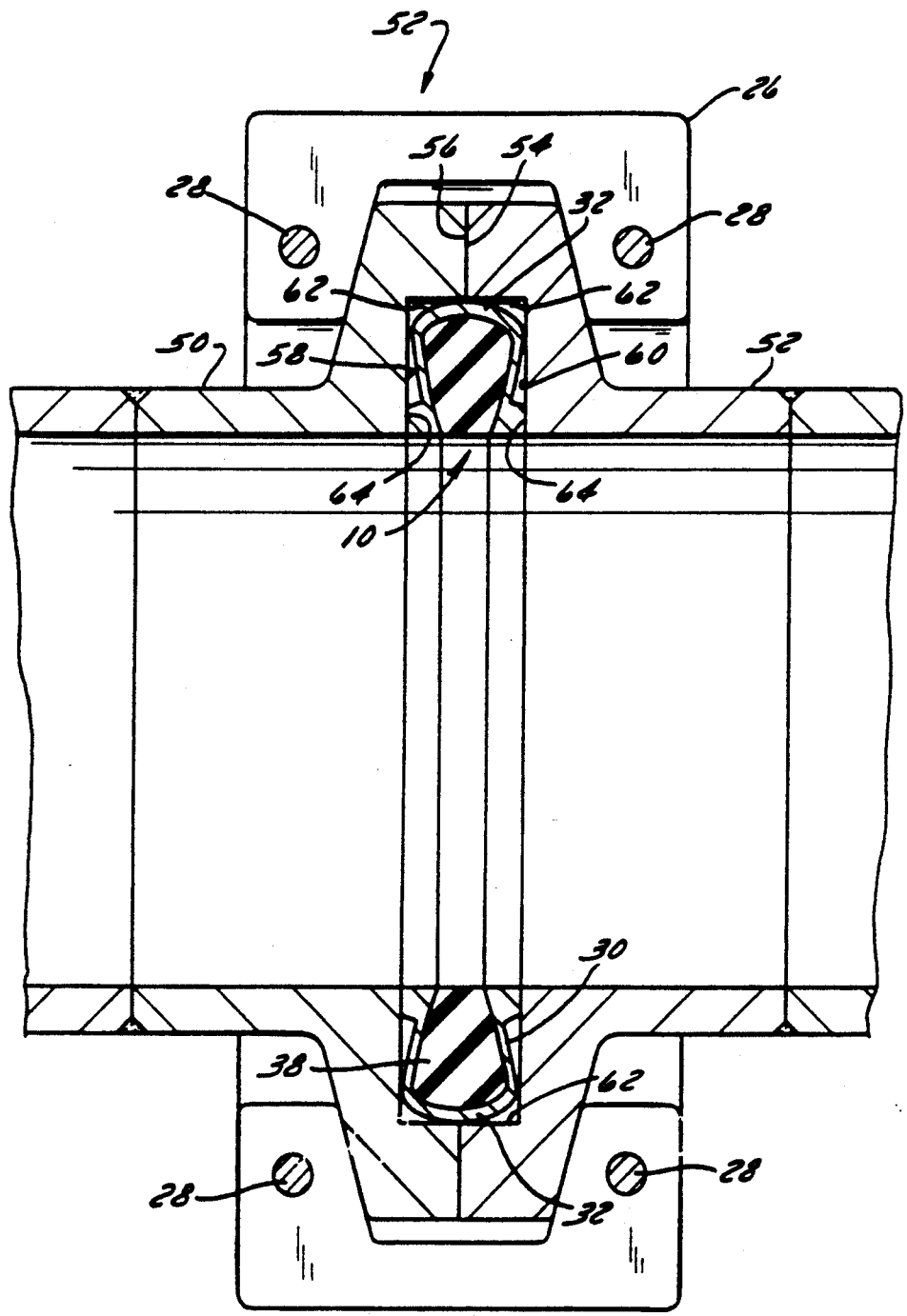
FIG. 8 is a view of identical ferrules for a pipe joint showing the ferrules centered by the U-shaped seal ring.

In the embodiment of the invention shown in FIG. 8, the U-shaped ring assembly 10 is used to center the ferrules 50, 52 for a pipe joint fitting 52. Each of the ferrules 50, 52 includes a radial contact surface 54, 56, respectively. A counterbore 58, 60 is provided in each of the surfaces 54, 56, respectively. Each counterbore includes an annular internal surface 62 and a radial surface 64. A U-shaped seal ring assembly 10 is initially positioned in the counterbore 58 of the ferrule 50 with the bight section 32 of the U-shaped ring 30 seated on the annular surface 62. The counterbore 60 of the other ferrule 52 is aligned with the bight section of the ring 30. The ring 30, which is made of stainless steel, has sufficient strength to hold the ferrules 50 and 52 in a coaxial relation while the "V" shaped clamps 26 are mounted on the ferrules 50, 52 to close the joint.

Thus, it should be apparent that there has been provided in accordance with the present invention a seal for aseptic fitting assembly that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A metallic U-shaped seal ring assembly for forming an aseptic pipe joint between a first ferrule having an internal bore and a radial surface and a second ferrule having an internal bore and a radial surface and a counterbore in the radial surface of one of said ferrules, said counterbore including an inner annular surface and an inner radial surface, said U-shaped seal ring assembly comprising a U-shaped ring having an annular bight section and a pair of legs, a flange on the end of each of said legs, each flange including a radial surface and a radially inner annular surface, the distance between the radial surfaces being greater than the axial depth of the counterbore whereby said flanges will be squeezed together on closing of the joint so that said annular surfaces of the flanges are flush with the internal bore of the ferrules and the radial surfaces of the flanges sealingly engage the radial surface of the first ferrule and the inner radial surface of said counterbore in the second ferrule.

2. The seal ring assembly according to claim 1 including:

a resilient material filling the space between the legs of said U-shaped ring.

3. The seal ring assembly according to claim 1 wherein said radial surfaces on said flanges are plated with a ductile material.

4. An aseptic pipe joint assembly comprising:

a first ferrule having an annular bore a radial surface and a counterbore in said radial surface, said counterbore including an inner radial surface, and a second ferrule having an annular bore a radial surface for matingly engaging said radial surface of said first ferrule, sealing means in said counterbore in said first ferrule for sealingly engaging said inner radial surface of said counterbore and said radial surface on said second ferrule, said sealing means including a U-shaped metallic ring and a resilient compound filling the inside of said U-shaped ring, said ring including an annular flange on the outside of said leg of the U-shaped ring positioned to engage said radial surface on said second ferrule and said inner radial surface in said counterbore and means on said flanges for forming a continuous bore of substantially the same radius as said bores in said ferrules, whereby said flanges will form a seal with said radial surfaces when said ferrules are closed.

5. The assembly according to claim 4 wherein said flanges on said U-shaped metallic ring are spaced apart a distance greater than the width of said U-shaped metallic ring whereby said flanges will deform the U-shaped legs of said metallic ring on closing the joint.

6. The assembly according to claim 4 wherein said first ferrule includes an annular flange and said second ferrule includes an annular recess for matingly engaging said annular flange and means for sealing said flange in said recess to protect the radial surfaces between the seals in said ferrules.

7. The assembly according to claim 4 including a soft metal plating on said flanges to seal the flanges to said radial surfaces.

8. An aseptic pipe joint comprising a pair of ferrules each having an inner bore, a radial surface and a counterbore in each radial surface, each counterbore including an inner annular surface and an inner radial surface, and a U-shaped ring mounted on the inner annular surface in each counterbore for aligning the inner bores of said ferrules, said ring assembly including an annular flange on each leg of the U-shaped ring, each flange including an annular radial surface positioned to sealingly engage the inner radial surface of said counterbores and an inner annular surface flush with said inner bore on closing of said ferrules.

9. The pipe joint according to claim 8 including a resilient sealing material filling the space between the legs of said ring, said material providing a bias force to hold said annular flanges in sealing engagement with said radial surfaces.

10. The pipe joint according to claim 9 wherein each flange includes an inner annular surface corresponding to the inner bore of said ferrules when said ferrules are closed and said resilient material forms a continuation of said inner annular surfaces of said ring when said ferrules are closed.

* * * * *